(12) United States Patent
Deng

(10) Patent No.: US 12,538,416 B2
(45) Date of Patent: Jan. 27, 2026

(54) DATA ADAPTER CABLE

(71) Applicant: Xifan Deng, Shenzhen (CN)

(72) Inventor: Xifan Deng, Shenzhen (CN)

( * ) Notice: Subject to any disclaimer, the term of this patent is extended or adjusted under 35 U.S.C. 154(b) by 183 days.

(21) Appl. No.: 18/536,412

(22) Filed: Dec. 12, 2023

(65) Prior Publication Data

US 2025/0159796 A1 May 15, 2025

(30) Foreign Application Priority Data

Nov. 10, 2023 (CN) .......................... 202323042257.7

(51) Int. Cl.
*H05K 1/02* (2006.01)
*H01R 12/59* (2011.01)
*H02J 7/00* (2006.01)

(52) U.S. Cl.
CPC ........... *H05K 1/028* (2013.01); *H01R 12/592* (2013.01); *H01R 2201/16* (2013.01); *H02J 7/00034* (2020.01)

(58) Field of Classification Search
None
See application file for complete search history.

(56) References Cited

U.S. PATENT DOCUMENTS

2014/0274221 A1\* 9/2014 Baschnagel ......... H04M 1/0274
174/74 R
2022/0074251 A1\* 3/2022 Schulz ................... E05F 15/77

\* cited by examiner

*Primary Examiner* — Timothy J Thompson
*Assistant Examiner* — John B Freal
(74) *Attorney, Agent, or Firm* — Birchwood IP

(57) ABSTRACT

The present disclosure provides a data adapter cable including: an adaptor plug, one end of the adapter plug is fixedly connected to a connection component; one end of a mobile phone plug component is connected to the connection component, and the other end of the mobile phone plug component is connected to a mobile phone; a flexible connection cable of the present disclosure is a FPC (Flexible Printed Circuit) component. The flexible connection cable can turn 90 degree and swing 180 degrees, with higher flatness and higher comfort compared to a circular-shaped connection cable, which avoids pricking hands, occupies small space and being flat.

4 Claims, 3 Drawing Sheets

DATA ADAPTER CABLE

CROSS-REFERENCE TO RELATED APPLICATIONS

This application claims priority to Chinese Patent Application No. 202323042257.7, filed on Nov. 10, 2023, which is hereby incorporated by reference in its entirety.

TECHNICAL FIELD

The present disclosure relates to the field of adapter cable technologies, and in particular, to a data adapter cable.

BACKGROUND

A data adapter cable is an electronic component used to transmit power or signals from one device to another. An adapter cable is a component that enables electrical connections between different devices. Traditional plug connection cables are generally thin, circular structures. When a mobile phone or electronic device is used while charging, the plug and connection cable may hinder a user using the mobile phone or electronic device when the user holding the mobile phone or electronic device, a circular-shaped structure has poor flatness, is prone to pricking a hand, occupies a large space, being uneven, mess, and thus, affecting user operation.

SUMMARY

In order to solve the above-mentioned technical problems, the present disclosure provides a data adapter cable to solve the problem of poor flatness, prone to prick a hand, occupying high space, unevenness, and mess of the circular-shaped connection cable when using a mobile phone or electronic device while charging, as proposed in the background technology, which affects user operation.

The present disclosure relates to a data adapter cable, which is achieved by the following specific technical means.

A data adapter cable, including an adapting plug, a connection component, and a mobile phone plug components; the adapter plug is a rectangular structure as a whole; one end of the adapter plug is fixedly connected to the connection component; one end of the mobile phone plug component is connected to the connection component, and the other end of the mobile phone plug component is connected to a mobile phone; the mobile phone plug component includes a flexible connection cable, the connection cable is a flattened rectangular structure as a whole, one end of the connection cable is connected to the connection component. The ultra-thin rectangular flexible connection cable is easy to adhere to a surface of an electronic device, thereby avoiding pricking a hand, occupying a small space, and being flat.

In an embodiment of the present disclosure, the connection component includes a nylon braided connection cable; one end of the nylon braided connection cable is connected to the adapter plug. The surface of the nylon braided connection cable is made of nylon material, which is wear-resistant, dirt resistant, and not easily damaged.

In an embodiment of the present disclosure, the connection component further includes a connection block; one end of the connection block is connected to the nylon braided connection cable, and the other end of the connection block is connected to the nylon braided connection cable.

In an embodiment of the present disclosure, the mobile phone plug component further includes a mobile phone plug, the mobile phone plug is a T shape as a whole; one end of the mobile phone plug is connected to the connection cable. The T-shaped mobile phone plug can facilitate a user to use a device while charging, thereby avoiding pricking a hand, occupying small space, and being flat.

In an embodiment of the present disclosure, mobile phone plug component further includes a contact surface; the contact surface is provided on a rear of the mobile phone plug, and the contact surface is provided on the rear of the mobile phone plug. Providing the contact surface on the rear of the mobile phone plug can prevent the mobile phone plug from damaging a palm.

Compared with existing technologies, the present disclosure has the following beneficial effects:

an interior of the data adapter cable is provided with a flexible connection cable, which is a flat rectangular structure, and the flexible connection cable is a FPC (Flexible Printed Circuit) component. The flexible connection cable can turn 90 degrees and swing 180 degrees and can be used for charging a mobile phone or an electronic device. Compared with traditional circular-shaped connection cables, the flatness is higher, and the comfort of use is higher than that of the circular-shaped connection cables, thereby avoiding pricking a hand.

Numeral reference: 1. adapter plug; 2. connection component; 201. nylon braided connection cable; 202. connection block; 3. mobile phone plug component; 301. connection cable; 302. mobile phone plug; 303. contact surface.

DESCRIPTION OF EMBODIMENTS

Below, a further detailed description of the implementation modes of the present disclosure will be provided in combination with the drawings and embodiments.

Embodiment 1

Figure 1:
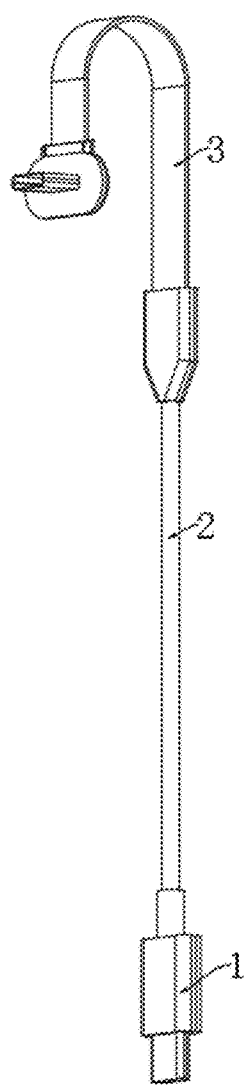
FIG. 1 is a structural schematic diagram of an axis side view of a body of a data adapter cable after being bent of the present disclosure.
Figure 2:
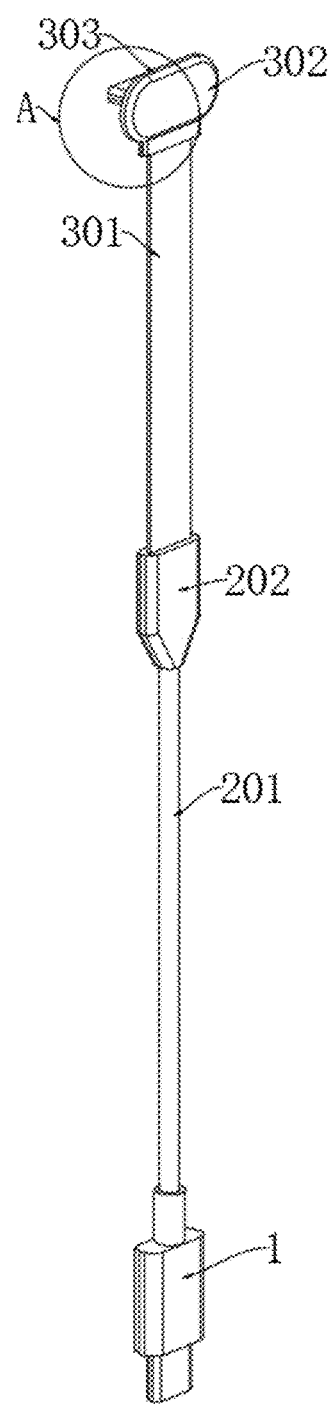
FIG. 2 is a structural schematic diagram of an axis side view of the body of the data adapter cable of the present disclosure.
Figure 3:
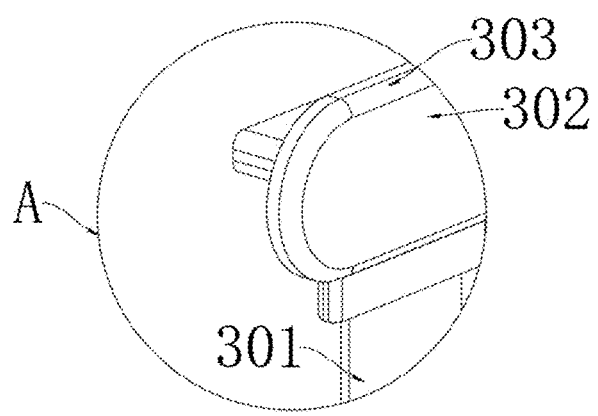
FIG. 3 is a schematic diagram of a locally enlarged structure of FIG. 2 of the present disclosure.

As shown in FIGS. 1 to 3: the present disclosure provides a data cable adapter, including an adapter plug 1, a connection component 2, and a mobile phone plug component 3; the adapter plug 1 is a rectangular structure as a whole, one end of the adapter plug 1 is fixedly connected to the connection component 2; one end of the mobile phone plug component 3 is connected to the connection component 2, and the other end of the mobile phone plug component 3 is connected to a mobile phone; the mobile phone plug component 3 includes a flexible connection cable 301; the flexible connection cable 301 is a flattened and long rectangular structure as a whole. One end of the flexible connection cable 301 is connected to the connection component 2. The flexible connection cable 301 is a FPC (Flexible Printed Circuit) component that can turn 90 degrees and swing 180 degrees. The ultra-thin rectangular flexible connection cable 301 is easy to adhere to a surface of an electronic device, thereby avoiding pricking a hand, occupying small space, and being flat.

As shown in FIG. 2, the connection component 2 includes: a nylon braided connection cable 201; one end of the nylon braided connection cable 201 is connected to the adapter plug 1. A surface of the nylon braided connection cable 201 is made of nylon material, which is wear-resistant, dirt resistant, and not easily damaged.

As shown in FIG. 2, the connection component 2 further includes a connection block 202; one end of connection block 202 is connected to the nylon braided connection cable 201, and the other end of the connection block 202 is connected to the nylon braided connection cable 201.

As shown in FIG. 3, the mobile phone plug component 3 further includes a mobile phone plug 302; the mobile phone plug 302 is a T-shaped structure as a whole. One end of the mobile phone plug 302 is connected to the flexible connection cable 301. The T-shaped mobile phone plug 302 can facilitate a user to use the device while charging, avoid pricking a hand, have a small space occupancy rate, and be flat.

As shown in FIG. 3, the mobile phone plug component 3 further includes a contact surface 303; the contact surface 303 is provided on a rear of the mobile phone plug 302, which can prevent the mobile phone plug 302 from damaging a palm.

The specific usage and function of this embodiment:

in the present disclosure, when in use, one end of the mobile phone plug 302 is inserted into a mobile phone socket, and the T-shaped mobile phone plug 302 fits a mobile phone or other electronic device. The flat and long flexible connection cable 301 is a FPC (Flexible Printed Circuit) component that can turn 90 degrees and swing 180 degrees. When using the device for charging the mobile phone or electronic device, the flat and long flexible connection cable 301 has a high flatness and high flatness function, avoiding pricking a hand, occupy small space, and being flatness.

The parts not detailed in the present disclosure are all well-known technologies for those skilled in the art.

What is claimed is:

1. A data adapter cable, comprising: an adapter plug, a connection component, and a mobile phone plug component;
   wherein the adapter plug is a rectangular structure as a whole, one end of the adapter plug is fixedly connected to the connection component, one end of the mobile phone plug component is connected to the connection component, and the other end of the mobile phone plug component is connected to a mobile phone;
   wherein the mobile phone plug component comprises a flexible connection cable, the connection cable is a flattened rectangular structure as a whole, one end of the connection cable is connected to the connection component, and the connection cable is a flexible printed circuit component;
   wherein the connection component comprises a connection block; one end of the connection block is connected to the nylon braided connection cable, and the other end of the connection block is connected to the nylon braided connection cable.

2. The data adapter cable according to claim 1, wherein the connection component further comprises a nylon braided connection cable; one end of the nylon braided connection cable is connected to the adapter plug, and a surface of the nylon braided connection cable is made of nylon material.

3. The data adapter cable according to claim 1, wherein the mobile phone plug component further comprises a mobile phone plug, the mobile phone plug is a T shape as a whole, one end of the mobile phone plug is connected to the connection cable.

4. The data adapter cable according to claim 3, wherein the mobile phone plug component further comprises a contact surface; the contact surface is provided on a rear of the mobile phone plug.

\* \* \* \* \*